United States Patent
Matsushima et al.

(10) Patent No.: US 8,277,704 B2
(45) Date of Patent: Oct. 2, 2012

(54) METHOD OF MANUFACTURING FORMED ARTICLE, MOLD AND METHOD OF MANUFACTURING THE SAME

(75) Inventors: Masaaki Matsushima, Shinjuku-ku (JP); Mikio Chisha, Shinjuku-ku (JP); Noriaki Taguchi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/094,059

(22) PCT Filed: Nov. 20, 2006

(86) PCT No.: PCT/JP2006/323134
§ 371 (c)(1),
(2), (4) Date: Jan. 9, 2009

(87) PCT Pub. No.: WO2007/058352
PCT Pub. Date: May 24, 2007

(65) Prior Publication Data
US 2009/0127727 A1 May 21, 2009

(30) Foreign Application Priority Data
Nov. 18, 2005 (JP) ................................. 2005-334187

(51) Int. Cl.
*B29D 11/00* (2006.01)
(52) U.S. Cl. ........................................ 264/2.5; 425/352
(58) Field of Classification Search ................... 425/352
See application file for complete search history.

(56) References Cited

U.S. PATENT DOCUMENTS

| | | | |
|---|---|---|---|
| 2,015,007 A | 9/1935 | Emerson | |
| 2,996,421 A | 12/1960 | Zimmerman et al. | |
| 3,607,186 A | 9/1971 | Bognar | |
| 3,623,800 A | 11/1971 | Volk | |
| 4,018,587 A | 4/1977 | Maitenaz | |

(Continued)

FOREIGN PATENT DOCUMENTS

EP 0 154 382 A2 9/1985

(Continued)

OTHER PUBLICATIONS

Official Decision on Grant issued in corresponding Russian Patent Application No. 2008124837, dated Sep. 10, 2010.

(Continued)

*Primary Examiner* — Yogendra Gupta
*Assistant Examiner* — Alison Hindenlang
(74) *Attorney, Agent, or Firm* — Sughrue Mion, PLLC

(57) ABSTRACT

The present invention relates to a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface. As the mold, a mold having, on a forming surface thereof, a plurality of irregularities with a maximum height Rmax ranging from 0.1 to 100 micrometers and an average spacing S between local peaks ranging from 0.01 to 1.00 mm is employed. The present invention further relates to a mold and method of manufacturing the same. According to the present invention, a formed article with a desired shape can be manufactured with high precision and high productivity by hot sag forming method without the occurrence of the fusion between the forming material and the mold.

14 Claims, 5 Drawing Sheets

(a)

(b)

U.S. PATENT DOCUMENTS

| | | | |
|---|---|---|---|
| 4,105,429 | A | 8/1978 | Delgado |
| 4,119,424 | A | 10/1978 | Comperatore |
| 4,349,374 | A * | 9/1982 | Rupp ............................. 65/107 |
| 4,589,901 | A | 5/1986 | Yoshizawa et al. |
| 4,859,225 | A | 8/1989 | Kuster et al. |
| 4,883,524 | A * | 11/1989 | Bristol ............................. 65/37 |
| 5,437,704 | A | 8/1995 | Yli-Vakkuri et al. |
| 5,589,024 | A | 12/1996 | Blake |
| 5,662,999 | A | 9/1997 | Taniguchi et al. |
| 5,766,542 | A | 6/1998 | Berrun-Castanon et al. |
| 6,240,746 | B1 | 6/2001 | Maeda et al. |
| 6,363,747 | B1 * | 4/2002 | Budinski et al. .................. 65/26 |
| 6,623,269 | B2 | 9/2003 | Tsutsui et al. |
| 6,740,366 | B2 * | 5/2004 | Hori et al. ..................... 427/515 |
| 7,008,058 | B2 | 3/2006 | Haimeri et al. |
| 7,950,252 | B2 | 5/2011 | Chisha et al. |
| 2003/0172337 | A1 | 9/2003 | Tsutsui et al. |
| 2005/0093210 | A1 | 5/2005 | Umetani |
| 2005/0110945 | A1 | 5/2005 | Haimerl et al. |
| 2008/0099935 | A1 | 5/2008 | Egle et al. |
| 2008/0134721 | A1 | 6/2008 | Maeda |
| 2009/0108477 | A1 | 4/2009 | Yamakaji et al. |
| 2009/0127727 | A1 | 5/2009 | Matsushima et al. |
| 2009/0289380 | A1 | 11/2009 | Chisha et al. |
| 2011/0127685 | A1 | 6/2011 | Taguchi et al. |
| 2011/0133352 | A1 | 6/2011 | Taguchi et al. |
| 2011/0163466 | A1 | 7/2011 | Taguchi et al. |
| 2011/0304064 | A1 | 12/2011 | Taguchi et al. |

FOREIGN PATENT DOCUMENTS

| | | | |
|---|---|---|---|
| JP | 55007507 | A | 1/1980 |
| JP | 61-048801 | A | 3/1986 |
| JP | 63-306390 | A | 12/1988 |
| JP | 01-171932 | A | 7/1989 |
| JP | 04-275930 | A | 10/1992 |
| JP | 06-130333 | A | 5/1994 |
| JP | 07-300328 | A | 11/1995 |
| JP | 9-124339 | A | 5/1997 |
| JP | 10-025123 | A | 1/1998 |
| JP | 10-078567 | A | 3/1998 |
| JP | 10-291828 | A | 11/1998 |
| JP | 11-116257 | A | 4/1999 |
| JP | 2000-229319 | A | 8/2000 |
| JP | 2000-302473 | A | 10/2000 |
| JP | 2000302473 | A * | 10/2000 |
| JP | 2000-327344 | A | 11/2000 |
| JP | 2001-322830 | A | 11/2001 |
| JP | 2001-335334 | A | 12/2001 |
| JP | 2003-232902 | A | 8/2003 |
| JP | 2005-132679 | A | 5/2005 |
| JP | 2005-350286 | A | 12/2005 |
| JP | 2008-221720 | A | 9/2008 |
| KR | 2002-0060445 | A | 7/2002 |
| RU | 2 087 430 | C1 | 8/1997 |
| RU | 2245852 | C1 | 2/2005 |
| SU | 1212992 | A1 | 2/1986 |
| SU | 1426954 | A2 | 9/1988 |
| WO | 95-23769 | A1 | 9/1995 |
| WO | 03/079095 | A2 | 9/2003 |
| WO | 2005-108317 | A1 | 11/2005 |
| WO | 2006/095007 | A1 | 9/2006 |
| WO | 2007/058353 | A1 | 5/2007 |
| WO | 2007/063734 | A1 | 6/2007 |
| WO | 2007/063735 | A1 | 6/2007 |
| WO | 2009/096085 | A1 | 8/2009 |
| WO | 2009/144943 | A1 | 12/2009 |

OTHER PUBLICATIONS

International Search Report for International Patent Application No. PCT/JP2006/323135, dated Jan. 9, 2007.
Official Decision on Grant dated Oct. 26, 2010, for Russian Patent Application No. 2008126286.
International Search Report for International Patent Application No. PCT/JP2010/001343 dated May 25, 2010.
Written Opinion of International Patent Application No. PCT/JP2010/001343, dated May 10, 2010.
International Preliminary Report on Patentability of Chapter I for International Patent Application No. PCT/JP2009/002361, dated Jan. 20, 2011.
International Search Report for International Patent Application No. PCT/JP2009/002361, dated Jul. 14, 2009.
Written Opinion of the ISA for International Patent Application No. PCT/JP2009/002361, dated Jul. 14, 2009.
International Search Report for International Patent Application No. PCT/JP2010/001344, dated May 25, 2010.
Written Opinion of International Patent Application No. PCT/JP2010/001344, (Form PCT/ISA/237), dated May 25, 2010.
International Search Report for International Patent Application No. PCT/JP2008/071352, dated Feb. 17, 2009.
Official Decision on Grant dated Sep. 10, 2010, for Russian Patent Application No. 2008124837.
International Search Report for International Patent Application No. PCT/JP2006/323134, dated Jan. 9, 2007.
Chinese Office Action dated Jun. 30, 2011, issued in Chinese Patent Application No. 200680043172.0.
Written Opinion of the ISA for International Patent Application No. PCT/JP2006/323137, dated May 29, 2008.
Official Decision on Grant dated Sep. 7, 2010, issued in Russian Patent Application No. 2008124822.
International Search Report for International Patent Application No. PCT/JP2006/323137, dated Jan. 9, 2007.
Office Action dated Aug. 16, 2010, issued in U.S. Application No. 12/095,648.
Office Action dated Aug. 6, 2010, issued in U.S. Application No. 12/095,258.
Office Action dated Feb. 10, 2011, issued in U.S. Application No. 12/095,258.
Office Action dated Mar. 28, 2011, issued in U.S. Application No. 11/916,402.
Office Action dated Dec. 12, 2011, issued in U.S. Application No. 11/916,402.
International Preliminary Report on Patentability of Chapter I for International Patent Application No. PCT/JP2010/001343, dated Sep. 9, 2011.
International Preliminary Report on Patentability of Chapter I for International Patent Application No. PCT/JP2010/001343, dated Sep. 22, 2011.
International Preliminary Report on Patentability of Chapter I for International Patent Application No. PCT/JP2010/001344, dated Sep. 9, 2011.
International Preliminary Report on Patentability of Chapter I for International Patent Application No. PCT/JP2010/001344, dated Sep. 22, 2011.
Fine Ceramics World page on the web, per Kyocera Corporation, as a PDF (Ceramic pdf).
Derwent Abstract of JP 55007507.
Office Action dated Jul. 3, 2012 issued in Japanese patent application No. 2007-545335.
Office Action dated Jul. 3, 2012 issued in Japanese patent application No. 2007-547903.
Office Action dated Jun. 13, 2012 issued in Chinese patent application No. 200680043172.0.

* cited by examiner (a)

(b)

(a)

(b)

(a)

(b)

(c)

METHOD OF MANUFACTURING FORMED ARTICLE, MOLD AND METHOD OF MANUFACTURING THE SAME

TECHNICAL FIELD

The present invention relates to a method of manufacturing a formed article by hot sag forming method, a mold that can be employed in hot sag forming method, and a method of manufacturing the same.

TECHNICAL BACKGROUND

Methods of forming glass molds for eyeglass lenses include employing mechanical grinding and polishing methods, mechanical grinding methods, and electrical processing methods such as electrical discharge processing to produce a heat-resistant base mold, bringing this base mold into contact with a glass blank softened by heating to transfer the surface shape of the base mold, employing a grinding program for each surface shape to be obtained, and forming a base mold having a corresponding surface shape.

In recent years, the demand has increased for multifocal eyeglass lenses being made thinner and lighter by incorporation of axially symmetric, aspherical lens design. The hot sag molding method has been proposed (see Japanese Unexamined Patent Publication (KOKAI) Heisei Nos. 6-130333 and 4-275930) as a method for forming molds to produce eyeglass lenses having such complex shapes.

DISCLOSURE OF THE INVENTION

In the hot sag forming method, a forming material comprised of a thermosoftening substance such as glass is placed on a mold, and softened by being heated to a temperature greater than or equal to its softening point, causing it to tightly contact with the mold. In the hot sag forming method, since the surface shape of the mold forming surface is transferred to the upper surface of the forming material, the forming surface of the mold has been conventionally subjected to mirror-finishing to increase the for the purpose of improvement of forming precision. However, the smoother the mold forming surface becomes, the more often the fusion with the forming surface occurs and thus it becomes difficult to release the mold, resulting in the problems of damage of both the mold and the forming material. In this manner, the achievement of both forming precision and prevention of fusion with the forming material was no easy matter.

In addition, in the hot sag forming method, there are cases where it is difficult to form the upper surface of the forming material into a desired shape because of inadequate contact between the forming surface of the mold and the lower surface of the forming material. This is thought to be caused by the difference of coefficient of thermal expansion between the mold-constituting material and the forming material.

Under such circumstances, it is an object of the present invention to provide a means capable of obtaining a formed article with a desired shape by hot sag forming method without the occurrence of the fusion between the forming material and the mold.

A further object of the present invention is to provide a means for obtaining a formed article with a desired surface shape by hot sag forming method with high precision.

The present invention relates to:
a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, wherein
as the mold, a mold having, on a forming surface thereof, a plurality of irregularities with a maximum height Rmax ranging from 0.1 to 100 micrometers and an average spacing S between local peaks ranging from 0.01 to 1.00 mm is employed.

The present invention further relates to:
a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, wherein
as the mold, a mold having a plurality of through-holes running from the forming surface to an opposite surface from the forming surface is employed,
comprising application of suction through the through-holes during the forming, and wherein
the formed article is a casting mold or a portion of a casting mold for eyeglass lens, and
openings of the through-holes on the forming surface side are arranged so as not to overlap with a position corresponding to a reference point for measurement of dioptric power in the eyeglass lens on the lower surface of the forming material when being into the tight contact.

The present invention further relates to:
a mold for use in a forming method forming an upper surface of a forming material comprised of a thermosoftening substance that has been positioned on a forming surface of a mold into a desired shape by heating the forming material to a temperature permitting deformation to bring a lower surface of the forming material into tight contact with the forming surface,
which has a plurality of irregularities with a maximum height Rmax ranging from 0.1 to 100 micrometers and an average spacing S between local peaks ranging from 0.01 to 1.00 mm on the forming surface.

The present invention further relates to:
a mold for use in a forming method forming an upper surface of a forming material comprised of a thermosoftening substance that has been positioned on a forming surface of a mold into a desired shape to obtain a formed article by heating the forming material to a temperature permitting deformation to bring a lower surface of the forming material into tight contact with the forming surface,
which has a plurality of through-holes running from the forming surface to an opposite surface from the forming surface, and wherein
the formed article is a casting mold or a portion of a casting mold for eyeglass lens, and
openings of the through-holes on the forming surface side are arranged so as not to overlap with a position corresponding to a refractive index measuring part in the eyeglass lens on the lower surface of the forming material when being into the tight contact.

The present invention further relates to:
a method of manufacturing a mold comprising:
forming a forming surface by grinding and/or cutting processing, and
forming a plurality of irregularities with a maximum height Rmax ranging from 0.1 to 100 micrometers and an average spacing S between local peaks ranging from 0.01 to 1.00 mm on the forming surface by said processing.

The present invention further relates to:

a method of manufacturing a mold comprising a forming surface having a through-hole, characterized by comprising:

a first hole-making process making a hole with a first acicular member from an opposite surface from the forming surface of the mold to a position at which the hole does not penetrate through the forming surface, and a second hole-making process inserting a second acicular member into the hole that has been made in the first hole-making process to penetrate the hole through the forming surface.

The present invention permits the manufacturing of formed articles of a desired shape with high precision and high productivity by hot sag forming method without the occurrence of the fusion between the mold and the forming material.

Method of Manufacturing Formed Article

The first method of manufacturing a formed article of the present invention (referred to as "the method of manufacturing formed article I", hereinafter) relates to a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface. In the method of manufacturing formed article I, as the mold, a mold having, on a forming surface thereof, a plurality of irregularities with a maximum height Rmax ranging from 0.1 to 100 micrometers and an average spacing S between local peaks ranging from 0.01 to 1.00 mm is employed.

The method of manufacturing a formed article of the second embodiment of the present invention (referred to as "the method of manufacturing formed article II", hereinafter) relates to a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface. In the method of manufacturing formed article II, as the mold, a mold having a plurality of through-holes running from the forming surface to an opposite surface from the forming surface is employed, and the method comprises application of suction through the through-holes during the forming, the formed article is a casting mold or a portion of a casting mold for eyeglass lens, and openings of the through-holes on the forming surface side are arranged so as not to overlap with a position corresponding to a reference point for measurement of dioptric power in the eyeglass lens on the lower surface of the forming material when being into the tight contact.

The methods of manufacturing formed article I and II will be described in detail below.

Method of Manufacturing Formed Article I

In the method of manufacturing formed article I, a mold having, on a forming surface thereof, a plurality of irregularities with a maximum height Rmax ranging from 0.1 to 100 micrometers and an average spacing S between local peaks ranging from 0.01 to 1.00 mm is employed. With the mold having the above irregularities on the forming surface, it is possible to form the upper surface of the forming material into a desired shape without influence of the surface property of the forming surface of the mold on the upper surface shape of the forming material while preventing the fusion with the forming material.

The maximum height Rmax of the irregularities ranges from 0.1 to 100 micrometers and the average spacing S between local peaks ranges from 0.01 to 1.00 mm. The above Rmax refers to a value that is measured according to the definition of surface roughness specified in JIS BO601-1982. The average spacing S between local peaks is a value measured according to the definition specified in JIS K7125, for example. When the Rmax and the S of the irregularities are respectively smaller than the above-described range, the fusion with the forming surface occurs, resulting in deterioration of the productivity. In contrast, when the Rmax and the S of the irregularities respectively exceed the above-described range, the roughness of the forming surface of the mold influences on the upper surface of the forming material and it is not possible to obtain a formed article with a desired shape. The roughness maximum height Rmax preferably ranges from 1 to 10 micrometers, more preferably 3 to 9 micrometers. The average spacing S between local peaks preferably ranges from 0.01 to 0.1 mm, more preferably 0.05 to 0.5 mm. The roughness of the forming surface is preferably 0.01 to 10 micrometers, more preferably 0.1 to 1 micrometer, and further preferably, 0.3 to 0.9 micrometer, as arithmetic average roughness Ra measured according to the definition of surface roughness specified in JIS BO601-1982.

In general, molds employed in hot sag forming method are subjected to mirror-finishing by polishing and the like. However, when the forming surface of the mold, that is to contact with the forming material, is a smooth surface such as a polished surface, the fusion with the forming material frequently occurs and the surface of the mold is damaged during the removal of the forming material and the like, resulting in deterioration of the durability. When the forming material made of glass is employed, the glass becomes impossible to stand its own weight at the temperature exceeding the glass transition temperature (Tg), and thus it becomes soft and changes its shape due to the gravity, resulting in contact with the forming surface of the mold. As the progress of the softening, the softening glass enters into the inside of the roughness of the mold forming surface. Thereby the fusion is thought to occur.

In contrast, the above-described mold has a surface roughness greater than that of the mold conventionally employed in hot sag forming method. FIG. 1 shows an enlarged schematic diagram of the state of contact between the mold and the forming material before and after heat-softening. As shown in FIG. 1, even when the mold of the present invention fuses to a portion of the forming material with the progress of softening, the fusion does not occur over the entire forming surface, but is limited to just protruding portions, and strong adhesion does not develop between the forming material and the forming surface of the mold. Thus, it becomes easy to separate the forming material from the mold, making it possible to avoid damage to the mold and to the forming material (formed article) following softening. Furthermore, the surface roughness of the forming surface of the mold of the present invention is defined within a range in which there is no influence on the upper surface shape of the forming material. Thus, with the mold of the present invention, it is possible to both prevent fusion and achieve forming precision.

The above height and spacing of the irregularities can be measured primarily using a Form Talysurf made by Taylor Hobson Corp., for example. With the Form Talysurf, a ruby or a diamond is positioned at the tip of the probe; the tip of the probe is displaced over the surface of, and in contact with, the lens; and the lens surface is scanned to measure the surface shape. The measurement scanning path is normally just linear. A portion of the surface is measured. The scanning direction during measurement is perpendicular to the irregularities on the forming surface of the mold. Following measurement, the height and spacing of the irregularities on the forming surface of the mold are determined by analysis of the values measured for the height and spacing of the irregularities.

The forming surface of the above-stated surface roughness can normally be obtained by grinding or cutting processing alone, without polishing. The method of manufacturing the mold will be described later. Although the pattern of irregularities formed varies with the type of the grinding machine and cutting machine, the irregularities can have any pattern. FIG. 5 shows specific examples of patterns of the irregularities. FIG. 5 (*a*) is a circular pattern, FIG. 5 (*b*) is an elliptical pattern, and FIG. 5 (*c*) is a streaky pattern.

The above-described forming surface preferably has a free-form shape. Thus, high-precision spherical forming materials having spherical polished surfaces and molds with a free-form shape can be combined to readily form the optical surfaces of free-form surfaces. According to the present invention, a mirror-finished free-form glass optical surface can be obtained without a need for the step of polishing the forming surface to a shape having a free-form surface. This is highly advantageous from the perspective of cost and productivity. The mold employed in the method of manufacturing formed article II described further below preferably has irregularities in the same manner as the mold employed in the method of manufacturing formed article I.

Method of Manufacturing Formed Article II

The formed article manufactured by the method of manufacturing formed article II is a casting mold or a portion of a casting mold for eyeglass lens. The casting mold can be employed for manufacturing eyeglass lenses by cast polymerization. In the method of manufacturing formed article II, a mold having a plurality of through-holes running from the forming surface to an opposite surface from the forming surface is employed as the mold, and suction is conducted through the through-holes during the forming. In addition, openings of the through-holes on the forming surface side are arranged so as not to overlap with a position corresponding to a refractive index measuring part in the eyeglass lens on the lower surface of the forming material when being into the tight contact.

As set forth above, in hot sag forming method, there are cases where it is difficult to form the upper surface of the forming material into a desired shape because of inadequate contact between the forming surface of the mold and the lower surface of the forming material. Accordingly, in the method of manufacturing formed article II, a mold having a plurality of through-holes is employed and suction is conducted through the through-holes during the forming in order to enhance the adhesion of the forming surface with the lower surface of the forming material. However, openings of the through-holes on the forming surface side are arranged so as not to overlap with a position corresponding to a refractive index measuring part in the eyeglass lens on the lower surface of the forming material when being into the tight contact.

The reason thereof will be described below.

Specifically, the above casting mold can be employed when manufacturing eyeglass lenses by mounting two casting molds on an annular gasket and pouring lens starting material solution into a cavity formed by the casting molds and the gasket to conduct polymerization. The mold employed in this method is generally designed according to the procedures comprising determining the surface shape of an eyeglass lens (design value determination), then converting the design values for the eyeglass lens into a casting mold surface shape (determination of casting mold design values) and then converting the casting mold design values into the surface shape of a mold. Each of these conversions may be conducted by a known method The shape of the surface positioned in the cavity of the casting mold that is manufactured using the mold having the surface shape thus determined is transferred to the eyeglass lens, making it possible to form optically functional surfaces. However, when unintended deformation occurs in the casting mold being formed due to suction through the through-holes, an optically functional surface with a shape differing from that of the design values ends up being formed. The position in an eyeglass lens having the greatest effect on optical characteristics is the reference point for measurement of the dioptric power. When there is a significant shift in the surface shape of this portion from the design values, it becomes difficult to obtain an eyeglass lens of desired refractive index. Accordingly, in the method of manufacturing formed article II, to prevent the above-described deformation at spots in the casting mold surface that are transferred to positions in the eyeglass lens at which reference points for measurement of dioptric power are formed, the openings of through-holes on the forming surface of the mold are arranged so that they do not overlap positions corresponding to reference points for measurement of dioptric power on the eyeglass lens on the lower surface of the forming material when the forming surface and the lower surface of the forming material are in tight contact. Thus, it is possible to obtain a casting mold (or a portion thereof) for eyeglass lenses free of deformation caused by suction at positions corresponding to reference points for measurement of dioptric power, and the casting mold can be employed to obtain high-quality eyeglass lenses having desired optical characteristics. When the forming material is formed into a formed article (a casting mold or the portion thereof), the surface that was the upper surface of the forming material (the opposite surface from the surface in tight contact with the forming surface) is transferred to the eyeglass lens. The "position corresponding to the reference point for measuring the dioptric power" of the lower surface of the forming material is a portion of the lower surface of the forming material opposite the portion of the upper surface of the forming material serving as the portion that is transferred to the reference point for measuring the dioptric power of the eyeglass lens on the surface of the casting mold obtained.

The reference point for measuring the dioptric power of eyeglass lens will be described below.

Generally, eyeglass lenses are classified as single-vision eyeglass lenses, multifocal eyeglass lenses, or progressive dioptric power eyeglass lenses. The above-described mold can be employed for the manufacturing of any types of eyeglass lens, is suitable for the manufacturing of single-vision eyeglass lenses and progressive dioptric power eyeglass lenses, and is particularly suitable for the manufacturing of progressive dioptric power eyeglass lenses.

Reference points for measurement of the dioptric power are specified in JIS T7315, JIS T7313, or JIS T7330. The reference points for the measurement of dioptric power are portions that are enclosed by circles about 8.0 to 8.5 mm in diameter, for example, on the surface on the object side or on the eyeball side of an eyeglass lens. In single-vision eyeglass lenses, the reference point for measurement of dioptric power is located in the center of the surface of the lens. In progressive dioptric power lenses and multifocal eyeglass lenses, there are multiple reference points for measurement of dioptric power. As is set forth further below, progressive dioptric power lenses can be roughly divided into the groups of general-purpose progressive dioptric power lenses, intermediate near progressive dioptric power lenses, and near near progressive dioptric power lenses. There are two reference points for measurement of dioptric power, called the reference point for measurement of the far portion and the reference point for measurement of the near portion, in general-purpose progressive dioptric power lenses and intermediate near progressive dioptric power lenses. There are two reference points for measurement of near portions in near near progressive dioptric power lenses. When manufacturing a casting mold (or a portion thereof) for the manufacturing of progressive dioptric power lenses by the method of manufacturing formed article II, the mold having no opening on the forming surface side at the positions corresponding to the above two reference points for measurement of dioptric power is employed.

Summaries of progressive dioptric power lenses are given in JIS T 7315 and JIS T 7330. Progressive dioptric power eyeglass lenses will be described below.

In progressive dioptric power eyeglass lenses, the far, intermediate, and near visual field regions are apportioned based on the frequency of use. The far region, which has a high use frequency, is often made broad, and is designed based on the emphasis of long-range or short-range. Applications vary based on differences in the breadth of the visual field region corresponding to the object distance. It is possible to distinguish three main categories: general-purpose progressive dioptric power lenses, intermediate near progressive dioptric power lenses, and near near progressive dioptric power lenses. There are also types with long-range emphasis and long-medium-range emphasis. General-purpose progressive dioptric power lenses are put to both long and short-range use, and have functions that permit both long and short-range vision. However, they are limited in the breadth of the visual field they afford in the medium and near regions. Generally, the broader the long and short-range visual field region, the greater the tendency for the distortion and swing particular to progression to be produced on the intermediate range side. Intermediate and near progressive dioptric power lenses are imparted with a broad intermediate region and near region by limiting the far region. The far region occupies a higher position than the general-purpose one and has a long progression band, so there is little of the distortion and swing particular to progression. However, such lenses are not suited to long-range vision. Near near progressive dioptric power lenses primarily have near ranges and do not have far ranges; they are thus sometimes classified as single-vision lenses. All of the above categories of progressive dioptric power lenses are suitable as object lenses manufactured using casting molds in the form of formed articles manufactured either by the manufacturing method of the present invention or using the mold of the present invention, described further below.

Progressive dioptric power lenses can be divided into three groups based on the disposition of progressive elements on the concave and convex surfaces of the lens. The first group consists of convex (external) surface progressive dioptric power lenses in which the progressive surface is disposed on the convex surface. The second group consists of concave (internal) surface progressive dioptric power lenses in which the progressive surface is disposed on the concave surface. And the third group consists of dual-surface aspherical progressive (also referred to as dual-surface compound progressive) dioptric power lenses, in which the progressive elements are divided between the two surfaces.

Convex surface progressive dioptric power lenses have a progressive surface on the convex surface, with the progressive dioptric power being formed based on the shape of the optical surface of the convex surface. Concave progressive dioptric power lenses are similar, with the exception of the difference in concavity and convexity.

Dual-surface aspherical progressive dioptric power lenses are imparted with the advantages of both "external surface progressive dioptric power lenses" and "internal surface progressive dioptric power lenses." Thus, they are progressive dioptric power lenses having a structure in which changes in the dioptric power in the vertical direction relating to the length of the progression band are distributed and positioned on the convex surface side, and changes in the dioptric power in the horizontal direction relating to swing and distortion are distributed and positioned on the concave surface side. The surface of this "dual-surface compound progression" is comprised of special aspherical surfaces that are not progressive surfaces on both surfaces, and differ structurally from the conventional progressive dioptric power lenses called "dual-surface progressive dioptric power lenses" in which the prescribed degree added is split between both surfaces being progressive surfaces. Since both surfaces of the lens can be used compositively, clear visual fields can be broadened for the far, intermediate, and near ranges. In particular, swing and distortion along the perimeter of the lens are improved.

All types of progressive dioptric power lenses are suitable as object lenses manufactured using casting molds in the form of formed articles manufactured either by the manufacturing method of the present invention or using the mold of the present invention, described further below.

Next, the arrangement of the above through-holes will be described.

FIG. 3 shows specific examples of the arrangement of through-holes on the forming surface of the mold.

As shown in FIG. 2(*a*), the above through-holes may be arranged evenly at equal intervals over the entire forming surface. However, the through-holes are provided so that the positions corresponding to reference points for measurement of dioptric power of the eyeglass lens on the lower surface of the glass material do not overlap the openings on the forming surface side when the forming surface and the lower surface of the forming material are brought into tight contact, as set forth above.

The through-holes in the mold are desirably arranged at least in the rim portion of the forming surface, it being preferable for plural through-holes to be positioned within a range smaller than the outer diameter of the glass material on at least two concentric circles.

Here, the term, rim portion of the forming surface means the portion surrounding the center portion of the forming surface. The term, center portion of the forming surface means, for example, a position from the center of the forming surface to about ½ the radius.

FIGS. 2(*b*) and (*c*) are examples of through-holes that have been arranged in the rim portion of the forming surface but not in the vicinity of the geometric center of the forming surface of the mold. In these cases, as well, the through-holes are provided so that the positions corresponding to reference points for measurement of dioptric power in the eyeglass lens on the lower surface of the forming material do not overlap the openings on the forming surface side when the forming surface and the lower surface of the glass material are in tight contact. Further, in FIG. 2(*b*), the through-holes in the rim portion are arranged at equal intervals on plural concentric circles. The number of through-holes positioned per unit area is small at positions near the center, with the number of through-holes per unit area increasing with the distance from the center. That is, the through-holes are arranged in a manner increasing from the center portion toward the rim portion (with few through-holes near the center and numerous through-holes in the rim portion). As the result of research conducted by the present inventors, the arranging of through-holes in this manner, particularly when employing a glass substance as the forming material, can ensure reliable transfer properties. In addition, the present inventors discovered that heat-softening deformation could be conducted uniformly over the entire surface and that distortion within the glass material could be suppressed. The reasons for this are not yet fully known, but are presumed to be as follows.

Properties exist whereby the rate of deformation of glass materials and the tendency for such deformation to take place are greatest in the center, while the rate of deformation is relatively low and deformation tends not to occur in the perimeter portion. As shown in FIG. 3 described further below, when the lower surface of the forming material is convex and the forming surface of the mold is concave, the support portion of the glass material is the edge portion of the circumference of the glass material. In this case, the perimeter edge portion of the glass material that is supported by the forming surface tends not to move even during heat-softening, acting as an inhibiting factor on deformation caused by softening along the perimeter edge portion. The circumference portion is thought to undergo a low rate of deformation and to tend not to undergo shape deformation. However, there is no support portion in the center, so there is no factor inhibiting deformation caused by softening. The present inventors discovered that actual deformation of a glass material starts in the center portion, spreading sequentially to the perimeter portion.

However, the difference between the rate of deformation in the rim portion and in the center portion of the glass material sometimes becomes a distortion generating factor within the glass material. This is because when the center portion of the glass material deforms first by heat-softening, and deformation does not occur in the rim portion, distortion develops between the center portion and the rim portion of the glass material. The facts that the rate of deformation in the perimeter portion is low and that deformation tends not to occur there also become factors that reduce transfer precision. Accordingly, numerous through-holes are arranged in the rim portion of the forming surface of the mold, the distribution of the suction force is increased in the rim portion, where deformation tends not to occur, and few through-holes are arranged in the center portion, which tends to undergo deformation, to suitably distribute the suction force per unit area. This is thought to ensure reliable transfer properties, allow heat-softening deformation to take place uniformly over the entire surface, and prevent distortion within the glass material. In this manner, it is possible to control the difference in the rate of deformation and in the tendency to deform due to location in the glass material by the arrangement of the through-holes, enhancing the transfer reproducibility of the glass shape. Aspiration through the through-holes affords the advantages of shortening the deformation time of the forming material and increasing productivity.

The arrangement of the through-holes can be suitably selected for each material to be formed. For example, FIG. 3(b) is suitable in the case of a relative large curve, such as when the shape to be processed is a curve with a mean curvature of equal to or greater than 8, and FIG. 3(c) is suitable in the case of a relatively small curve, such as a curve with a mean curvature of equal to or less than 5. Further, as shown in FIG. 2(a), arranging the through-holes evenly over the entire surface is suitable for shapes with free-form surfaces, such as progressive dioptric power lenses.

The number of through-holes formed in the mold is not specifically limited and may be suitably determined. When the forming surface has a diameter of about 80 to 100 mm, for example, about 6 to 60 through-hole openings may be arranged on the forming surface.

Also in the method of manufacturing formed article I, a mold having a plurality of through-holes running from the forming surface to the opposite surface from the forming surface is desirably employed, and suction is desirably applied through the through-holes during heat-forming. As shown in the enlarged schematic drawings of FIG. 1, the mold employed in the method of manufacturing formed article I has irregularities on the surface. Space remains between the forming surface and the forming material as shown in FIG. 1(b), even after heat-softening to bring the forming surface into tight contact with the lower surface of the forming material. The formation of this space has the effect of preventing the fusion, as mentioned above. On the other hand, air remains in this space and air pockets are formed. When these air pockets remain between the forming surface and the forming material, the air is sometimes trapped without being discharged. However, these air pockets create space between the forming surface and the forming material, creating the risk of impeding shape control of the forming material by the forming surface when the forming material comes into contact with the forming surface. Accordingly, in the method of manufacturing formed article I, through-holes can be provided in the forming surface and aspiration can be conducted to remove the air pockets. When employing a mold having through-holes as the mold employed in the method of manufacturing formed article I, the through-holes are preferably provided in the mold in the same manner as in the method of manufacturing formed article II, due to the reasons as set forth above.

Next, processes for manufacturing a formed article will be described.

First, the forming material comprised of a thermosoftening substance is positioned on the forming surface of the mold. Glass can be employed as the above thermosoftening substance. Among them, glasses such as crown-based, flint-based, barium-based, phosphate-based, fluorine-containing, and fluorophosphate-based glasses are suitable. In a first example, suitable glass is glass comprising $SiO_2$, $B_2O_3$, and $Al_2O_3$ as the structural components and having the glass material composition of, given as molar percentages, 45 to 85 percent $SiO_2$, 4 to 32 percent $Al_2O_3$, 8 to 30 percent $Na_2O+Li_2O$ (with $Li_2O$ constituting equal to or less than 70 percent of $Na_2O+Li_2O$), the total quantity of ZnO and/or $F_2$ being 2 to 13 percent (where $F_2$<8 percent), $Li_2O+Na_2O/Al_2O_3$ being 2/3 to 4/1, and $SiO_2+Al_2O_3+Na_2O+Li_2O+ZnO+F_2$>90 percent.

In a second example, suitable glass are glass having the glass material composition of, given as molar percentages, 50 to 76 percent $SiO_2$, 4.8 to 14.9 percent $Al_2O_3$, 13.8 to 27.3 percent $Na_2O+Li_2O$ (where $Li_2O$ is less than or equal to 70 percent of $Na_2O+Li_2O$), the total quantity of ZnO and/or $F_2$ being 3 to 11 percent (where $F_2$<8 percent), $Li_2O+Na_2O/Al_2O_3$ being 2/3 to 4/1, and $SiO_2+Al_2O_3+Li_2O+Na_2O+Li_2O+ZnO+F_2$>90 percent.

In a third example, the glass composition is: $SiO_2$ (47.8 percent), $Al_2O_3$ (14.0 percent), $Na_2O$ (12.1 percent), $B_2O_3$ (percent), ZnO (6.0 percent), $F_2$ (2 percent), MgO (2 percent), $Li_2O$ (16.1 percent), $As_2O_3$ (0.3 percent).

In a fourth example, a further suitable glass composition is: $SiO_2$ (63.6 percent), $Al_2O_3$ (12.8 percent), $Na_2O$ (10.5 percent), $B_2O_3$ (1.5 percent), ZnO (6.3 percent), $Li_2O$ (4.8 percent), $As_2O_3$ (0.3 percent), $Sb_2O_3$ (0.2 percent). Other metal oxides, such as MgO, PbO, CdO, $B_2O_3$, $TiO_2$, and $ZrO_2$;

coloring metal oxides; and the like may be added to stabilize the glass, facilitate melting, and impart color, so long as they do not exceed 10 percent.

As further characteristics of the glass material, for example, suitable thermal properties are: a distortion point of 460 to 483° C., an annealing point of 490 to 621° C., a softening point of 610 to 770° C., a glass transition temperature (Tg) of 510 to 665° C., a yield point (Ts) of 535 to 575° C., a specific gravity of 2.47 to 3.65 (g/cm$^3$), a refractive index, Nd, of 1.52300 to 1.8061, a thermal diffusion rate of 0.3 to 0.4 cm$^2$*min, a Poisson ratio of 0.17 to 0.26, a photoelasticity constant of 2.82×10 E-12, a Young's modulus of 6,420 to 9,000 kgf/mm$^2$, and a coefficient of linear expansion of 8 to 10×10 E-6/° C. A distortion point of 460° C., an annealing point of 490° C., a softening point of 650° C., a glass transition temperature (Tg) of 485° C., a yield point (Ts) of 535° C., a specific gravity of 2.47 (g/cm$^3$), a refractive index, Nd, of 1.52300, a thermal diffusion rate of 0.3576 cm$^2$*min, a Poisson ratio of 0.214, a photoelasticity constant of 2.82×10 E-12, a Young's modulus of 8,340 kgf/mm$^2$, and a coefficient of linear expansion of 8.5×10 E-6/° C. are particularly preferred.

However, the present invention can be applied to those other than glass and is not limited to the above embodiment.

The above forming material can be obtained by processing the thermosoftening substance into a desired shape. The forming material can be processed by known methods. The shape of the forming material may be a plate shape, spherical, elliptical, a rotationally symmetric shape (toric lenses, aspherical rotationally symmetric dioptric power lenses), a free-form surface shape (progressive dioptric power lenses, aspherical dual-surface dioptric power lenses), or the like. A meniscus shape having two polished spherical surfaces is preferred. The surfaces of the forming material are desirably mirror surfaces. The roughness of the surfaces is desirably a roughness maximum height Rmax of less than or equal to 0.04 micrometer and an arithmetic average roughness Ra of less than or equal to 0.005 micrometer. The lower limit of roughness for the glass material is, for example, a maximum roughness Rmax of 0.01 micrometer and an arithmetic average roughness Ra of 0.01 micrometer.

Subsequently, the forming material is heated to a temperature permitting deformation on the mold. The "temperature permitting deformation" is desirably a temperature that is greater than or equal to the glass transition temperature (Tg) in the case of the forming material comprised of glass. Heating may be conducted by a known method, such as by positioning the mold in an electric furnace. By controlling the atmospheric temperature in the electric furnace to a temperature set for the forming material, the forming material can be heated to a desired temperature. The details of temperature control will be described further below.

FIG. 3 shows a schematic diagram of the state of contact between the forming material and the mold before and after softening. As shown in FIG. 3(a), prior to heating, there is a partial gap between the lower surface of the forming material and the forming surface; there is not complete, tight contact. When the forming material is heated while in this state, the fluidity of the forming material increases as it softens. As shown in FIG. 3(b), it contacts tightly with the forming surface. The term "contact tightly" here does not mean a state in which the forming material penetrates into irregularities on the forming surface.

In the present invention, as shown in FIG. 3, a duct protective lid can be positioned over the mold on which the forming material has been positioned to prevent contamination by foreign matter such as dust and debris during the forming. As shown in FIG. 2, a support member can be positioned on the rid portion of the mold. The support member effectively positions the forming material.

When the forming material is heated to a temperature permitting deformation to form the forming material, suction is carried out in the method of manufacturing formed article II, and can be carried out in the method of manufacturing formed article I. To conduct high-precision forming while conducting suction through through-holes, it is desirable for the diameter of the through-holes, the viscosity of the glass material during suction, the thickness of the forming material, and the suction pressure to satisfy Equation 1 below. In particular, the mold employed in the method of manufacturing formed article I as set forth above, the surface roughness of the forming surface is higher than that of the mold for conventional hot sag forming method. When conducting an excessive level of suction through the through-holes in such a mold, there is a risk that the surface roughness of the forming surface and the shape of the through-holes affect the shape of the upper surface of the forming material. Thus, it is desirable to satisfy Equation 1 when conducting suction.

[Numeral 1]

$$H = K\frac{(V) \times (T)^2}{(P)} \qquad \text{Equation 1}$$

Specifically, Equation 1 may be expressed as Equation 1-1 below.

[Numeral 2]

$$H = \frac{2.0 \times 10^{-8}(V) \times 10^2(T)^2}{36(P)} \qquad \text{Equation 1-1}$$

In the above equations, H denotes the diameter (mm) of the through-holes, V denotes the viscosity (poise) of the glass material during suction, T denotes the thickness (mm) of the glass material, and P denotes the suction pressure (mmHg/cm$^2$), where 1 poise=0.1 Pa·s. K denotes a coefficient; 1.8 to 3.0×10$^{-9}$ is suitable.

Specifically, the diameter of the through-holes can be 0.3 to 0.5 mm, the viscosity of the forming material during aspiration can be 6.81×10$^{+7}$ to 1.26×10$^{+8}$ poise, the thickness of the forming material can be 4 to 7 mm, and the suction pressure can be 80 to 120 mmHg/cm$^2$ ($\approx$1.0×10$^4$ to 1.6×10$^4$ Pa/cm$^2$).

The thickness of the forming material can be assumed identical during forming. In Equation 1 above, the thickness of the forming material is the thickness at the start of forming. In the present invention, based on Equation 1 above, the temperature of the forming material during heat-softening can be monitored with a thermocouple or the like, the viscosity of the forming material can be calculated, and the suction pressure can be set. The suction pressure can also be set based on the relation between the temperature and the viscosity, the latter being calculated from the viscosity characteristics of the forming material employed.

The glass material during the suction is in a softened state by heating. The present inventors discovered that glass in a softened stage deformed as a viscoelastic material. Accordingly, the suction in the present invention is preferably conducted taking characteristics of viscoelastic deformation into account. This will be described below.

When the glass material deforms viscoelastically, either of the concavity surface and convexity surface is contracted toward the direction contacting with the surface, and the opposite surface is extended to deform. However, there is a plane (neutral surface) between the concavity surface and convexity surface where neither the contraction nor the extension occurs in the tangential direction. As for the deformation of the viscoelastic material, the degree of deformation is small and the rate of deformation is also small at a position at which the viscoelastic material is supported and fixed. In contrast, there is a tendency that, at the position away from the support position, the degree of deformation is large and the rate of deformation is also large. By way of example, the shape change of a plate viscoelastic material will be discussed. Since the degree of deformation of the viscoelastic material is clearly discussed as for the neutral surface, the target below will be the neutral surface of the viscoelastic material unless specifically indicated otherwise. As for the neutral surface of the viscoelastic material, it is known that, when it is supported and fixed at both ends with the application of a constant force (V) such as gravity, the distance X from the base point at which it is supported and fixed and the degree of deformation are denoted by the following equation:

$$w = VX2/2D*(L-X/3) \qquad \text{Equation 2}$$

wherein D is a bending rigidity modulus (that is constant for the material), and L is a cross-sectional length (fixed value) of the viscoelastic material.

That is, it is understood from the above Equation 2 that the degree of deformation of the viscoelastic material changes in quadratic curve manner as it is away from the support portion, being referred to as 0. As described above, when the lower surface of the forming material is a convex surface and the forming surface of the mold is a concave surface, the glass material is positioned so that it is supported and fixed at the rim portion of the glass material as well as it is separated from the forming surface at around the center portion. Thus, it is expected that, if the glass material deforms viscoelastically, the deformation would be large at the center portion and small at the rim at which it is supported and fixed. Thus, in the glass material, there is a portion that tends not to deform merely with gravity affecting the entire glass uniformly and the deformation hardly occurs especially at a portion at which it is supported and fixed. Accordingly, the present inventors arranged the through-holes on the forming surface of the mold so that the number of the through-holes is small at the center portion at which the deformation tends to occur and the number of the through-holes is large at the edge portion of the glass material at which the deformation hardly occurs to distribute the suction force more in the rim portion. That is, the though-holes were arranged so that the number of the though-holes is minimum at the center portion and increases as being closer to the rim portion so as to supplement the above Equation 2. It is further suitable that the distribution of the through-holes increases in a quadric manner in proportion to a distance from the center according to the above equation.

The suction method will be described below based on FIG. 4. FIG. 4 is a drawing of an example of the suction method. However, the present invention is not limited to the embodiment shown in FIG. 4.

As shown in FIG. 4, mold 402, on which has been positioned a forming material, is placed on aspiration base 403. Suction is conducted by suction base 403 and suction pump part 404. Suction base 403 is a platelike hollow base in which the spots where molds are positioned is hollowed in a concave shape. It is made of a material such as heat-resistant stainless steel (SUS310S). Air inlets 407 are positioned at the spots where molds are positioned on the upper surface of the suction base. Discharge outlets for feeding aspirated air to the suction pump are located on the lower surface of the suction base and connected to suction terminal 405 that is linked to the suction pump. The suction pressure is desirably set to satisfy Equation 1 above; for example, it can be set to 80 to 120 mmHg ($\approx 1.0 \times 10^4$ to $1.6 \times 10^4$ Pa).

A specific embodiment of the method of manufacturing a formed article of the present invention will be described below. However, the present invention is not limited to the embodiment described below.

First, preferably in a clean room, a mold is positioned with the forming surface on top. When employing a support member in the manner set forth above, the support member is fitted into the rim portion of the forming surface and the step mount member of the lateral surface. The glass material is then placed in a prescribed position on the forming surface along the support member. The edge-surface of the lateral portion of the glass material is securely supported horizontally by the support member. The edge surface of the rim portion of the lower surface of the glass material contacts the forming surface of the mold in a vertical direction, and is securely supported. The center portion on the side of the contact surface of the glass material with the mold is separated from the forming surface of the mold. The separation distance varies with the shape of the forming surface of the mold and the lower surface of the forming surface material, but is normally about 0.1 to 2.0 mm.

Next, the lid member is desirably fitted into the support member and placed. After covering the exposed portion at the top of the mold on which the glass material has been positioned with the lid member, they are sent from the clean room to an electric furnace. The assembly of the mold, support member, glass material, and lid member is placed on the suction base of the electric furnace and heat treated with the electric furnace and suction treatment is conducted with a suction device. To reliably prevent contamination by foreign matter, the positioning of the glass material on the mold and the like is desirably conducted in a clean room in this manner.

In the electric furnace, a heat-softening treatment can be conducted while effecting temperature controls based on a preset temperature program. Either a batch-type electric furnace or a continuous feed-type electric furnace may be employed as the electric furnace. The description of a batch-type electric furnace will be given first.

A batch-type electric furnace is a device in which a piece to be processed is placed in a relatively small, confined space and the temperature within the furnace is varied according to a predetermined temperature program. It is equipped with plural sensors. The temperature is measured by the plural sensors, and each heater can be controlled to manage the temperature. In a batch-type heat-softening furnace, there is a support part holding the piece to be processed. Furthermore, the support part can move within the furnace. Imbalances in temperature distribution due to location within the furnace can be equalized by operating the support part.

A continuous feed-type electric furnace will be described next.

A continuous feed-type electric furnace is a device having an entrance and an exit, in which pieces to be processed are heat treated by being passed through the interior of an electric furnace of set temperature distribution over a certain period by a conveying device such as a conveyor. In a continuous feed-type electric furnace, plural heaters designed to generate and release heat and an internal air circulation control structure can maintain a uniform heat distribution within the furnace.

PID controls can be employed in temperature control by each sensor and heater of the electric furnace. PID controls are a control method for detecting deviation between a programmed target temperature and the actual temperature and restoring (feedback) the deviation from the target temperature to 0. PID controls are a method of obtaining an output in "Proportional", "Integral", "Differential" manner when calculating from the deviation. The general equation of PID controls is given below.
[Numeral 3]
General Equation of PID Controls:

$$y = Kp\left(e + K_I \int e\,dt + K_D \frac{d}{dt}e\right)$$

P term:

$$Kp \cdot e_n$$

I term:

$$\int e\,dt = \lim_{\Delta t \to 0}\left(\sum_{i=0}^{n} e_i \Delta t\right) - \Delta t \Sigma e_n$$

D term:

$$\frac{d}{dt}e = \lim_{\Delta t \to 0}\left(\frac{\Delta e}{\Delta t}\right)$$

$$\Delta e = e_n - e_{n-1}$$

as $$\frac{1}{\Delta t}(e_n - e_{n-1})$$

Thus:

$$y = Kp\left[e_n + K_I \Delta t \Sigma e_n + \frac{K_D}{\Delta t}(e_n - e_{n-1})\right]$$

In the above equations, e denotes deviation, K denotes gain (the gain with the subscript P denotes proportional gain, the gain with the subscript I denotes integral gain, and the gain with the subscript D denotes differential gain), Δ(DELTA)t denotes the sample time (sampling time, control frequency), and subscript n denotes the current time.

Using PID controls makes it possible to increase the precision with which the temperature is controlled within the furnace for changes in the heat quantity distribution based on the shape and quantity of inputted pieces to be processed. A nonsliding system (for example, a walking beam) can be adopted for conveyance within the electric furnace.

In the specific embodiment of a continuous feed-type electric furnace that can be used in the present invention, the conveyance system is a nonsliding system, the temperature controls are PID temperature controls, the temperature measurement device is "K thermocouple 30 point made by Platina", a maximum use temperature is 800° C., the commonly employed temperature ranges from 590 to 650° C., the internal atmosphere is a dry air (free of oil and dust), the atmospheric control is in the form of an inlet air curtain, internal furnace purging, and an outlet air curtain, and the temperature control precision is ±3° C., and the cooling system is air cooling, and suction parts are at 3 positions within the furnace.

When employing a glass substance as a glass material, the temperature within the electric furnace can be increased from room temperature to higher than the glass softening point, but lower than the glass softening point, by heating and rising temperature. The temperature is desirably maintained lower than the glass softening point for a certain period, and then gradually reduced to room temperature.

The temperature is controlled within the electric furnace in a cycle of prescribed duration.

An example of temperature control in which an individual cycle lasts 17 hours and a glass substance is employed as the glass material will be described below. However, the present invention is not limited to the embodiment described below.

Furnace temperature control can be conducted in seven steps. The first step (A) is a preheating step. The second step (B) is a rapid heating and temperature-rising step. The third step (C) is a slow heating and temperature-rising step. The fourth step (D) is a step in which a constant temperature is maintained. The fifth step (E) is a slow cooling step. The sixth step (F) is a rapid cooling step. And the seventh step (G) is a natural cooling step.

In the preheating step (A), which is the first step, a constant temperature close to room temperature is maintained for 90 minutes. This is done in order to establish a uniform temperature distribution throughout the glass material and to facilitate reproducibility of the thermal distribution of the glass material by temperature control during processing by heat-softening. The temperature that is maintained can be any temperature of about room temperature (about 20 to 30° C.).

In rapid heating step (B), which is the second step, heating is conducted for about 90 minutes by increasing the temperature from room temperature (for example, 25° C.) to a temperature 50° C. below (also called "T1" hereinafter) the glass transition temperature (also referred to as "Tg" hereinafter) at a rate of about 4° C./min, for example. Then, in slow heating step (C), which is the third step, heating is conducted for 120 minutes by increasing the temperature from temperature T1 to a temperature about 50° C. below the glass softening point (also called "T2" hereinafter) at a rate of 2° C./min, for example. In constant temperature maintenance step (D), which is the fourth step, temperature T2 is maintained for about 60 minutes.

The glass material that has been heated to temperature T2 is heated for about 30 minutes in the constant temperature maintaining step. Heating is then conducted for another 30 minutes at temperature T2. When a mold having through-holes as described above is employed, during these latter 30 minutes, suction processing can be conducted through the through-holes in the mold. The suction processing can be conducted by operating a suction pump positioned outside the electric furnace. As shown in FIG. 4, suction pump 404 is connected to suction terminal 405, suction base 403 and through-holes in the mold, respectively. When suction is conducted by the suction pump, a negative pressure is generated. The negative pressure passes through the through-holes in the mold, applying suction to the glass material positioned in the mold. The generation of a suction of 80 to 150 mmHg (≈1.0× $10^4$ to 1.6×$10^4$ Pa) through a suction inlet of the prescribed heat-resistant base mold begins 30 minutes after the start of heating at temperature T2 in the electric furnace. First, suction pump 404 outside the furnace is operated, and negative pressure is generated through suction terminal 405 within the interior of the aspiration base, which has a hollow configuration. The suction base in which negative pressure has been generated is communicated to the through-holes on the bottom surface of the mold. The through-holes on the bottom surface of the mold penetrate to the forming surface at the top of the mold and conduct suction by applying the negative pressure by suction to the glass material positioned on the mold. As set forth above, the use of a lid member of prescribed permeability to air is desirable when conducting suction through the through-holes.

Once the suction has been completed, heat-softening deformation of the glass material onto the mold is concluded.

Once deformation by heat-softening has been concluded, cooling is conducted. In slow cooling step (E), the fifth step, cooling is conducted, for example, for about 300 minutes at a rate of 1° C./min to a temperature 100° C. below Tg (also called "T3" hereinafter) to fix the change in shape caused by deformation. The slow cooling step also comprises annealing elements to remove glass distortion.

Next, in rapid cooling step (F), the sixth step, cooling is conducted to about 200° C. at a rate of about 1.5° C./min. There is a risk of the glass that has been processed by softening and the mold being damaged by their own thermal contraction and differences between each other in coefficients of thermal expansion to temperature change. Accordingly, the temperature change rate is preferably small to the extent that damage does not occur.

Further, when the temperature drops to equal to or lower than 200° C., rapid cooling step (G), the seventh step, is conducted. In rapid cooling step (G), natural cooling is conducted from 200° C. to room temperature.

Once softening processing has been completed, the lower surface of the glass material and the forming surface of the mold fit precisely together. The upper surface of the glass material deforms based on the shape deformation of the lower surface of the glass material, forming the desired optical surface. Once the glass optical surface has been formed in the above steps, the glass material is removed from the mold, yielding a formed article. The formed article thus obtained can be employed as a casting mold for eyeglass lenses (preferably multifocal eyeglass lenses). Alternatively, a portion such as the rim portion can be removed and then the formed article can be employed as a casting mold for eyeglass lenses.

Mold

The mold of the first embodiment of the present invention (referred to as "mold I", hereinafter) is a mold for use in a forming method forming an upper surface of a forming material comprised of a thermosoftening substance that has been positioned on a forming surface of a mold into a desired shape by heating the forming material to a temperature permitting deformation to bring a lower surface of the forming material into tight contact with the forming surface, which has a plurality of irregularities with a maximum height Rmax ranging from 0.1 to 100 micrometers and an average spacing S between local peaks ranging from 0.01 to 1.00 mm on the forming surface. The mold of the second embodiment of the present invention (referred to as "mold I", hereinafter) is a mold for use in a forming method forming an upper surface of a forming material comprised of a thermosoftening substance that has been positioned on a forming surface of a mold into a desired shape to obtain a formed article by heating the forming material to a temperature permitting deformation to bring a lower surface of the forming material into tight contact with the forming surface, which has a plurality of through-holes running from the forming surface to an opposite surface from the forming surface, and wherein the formed article is a casting mold or a portion of a casting mold for eyeglass lens, and openings of the through-holes on the forming surface side are arranged so as not to overlap with a position corresponding to a refractive index measuring part in the eyeglass lens on the lower surface of the forming material when being into the tight contact. The above molds can be employed ion the method of manufacturing formed article of the present invention and details thereof are as set forth above.

Method of Manufacturing Mold

The method of manufacturing a mold of the first embodiment of the present invention (referred to as "the method of manufacturing mold I", hereinafter) comprises forming a forming surface by grinding and/or cutting processing, and forming a plurality of irregularities with a maximum height Rmax ranging from 0.1 to 100 micrometers and an average spacing S between local peaks ranging from 0.01 to 1.00 mm on the forming surface by said processing.

The method of manufacturing a mold of the second embodiment of the present invention (referred to as "the method of manufacturing mold II", hereinafter) is a method of manufacturing a mold comprising a forming surface having a through-hole, and comprises a first hole-making process making a hole with a first acicular member from an opposite surface from the forming surface of the mold to a position at which the hole does not penetrate through the forming surface, and a second hole-making process inserting a second acicular member into the hole that has been made in the first hole-making process to penetrate the hole through the forming surface.

By the method of manufacturing mold I, the mold employed in the method of manufacturing formed article I and mold I can be obtained. Common methods of manufacturing a mold comprise a polishing process to smooth the forming surface following a grinding or cutting process. However, since the forming surface is adjusted into a desired surface shape in the cutting process, slight dimension error may occur by shaving off the forming surface in the polishing process. However, this error should be eliminated when precise three-dimensional shape is required for the forming surface. Thus, formation of the forming surface by grinding and/or cutting processing without a polishing process have the advantage that a desired three-dimensional shape can be formed precisely on the forming surface of the mold. The grinding processing and/or cutting processing are not specifically limited so long as the above irregularities and can be conducted by the known method. Details thereof will be described further below.

On the other hand, by the method of manufacturing mold II, the mold employed in the method of manufacturing formed article II and mold II can be obtained.

Since metals have poor durability at 800° C., which is generally the maximum temperature of softening processing, and have high coefficients of thermal expansion, the shape is greatly deformed by thermal expansion occurring with temperature changes in the vicinity of 800° C. When the level of deformation is great, there is a risk that at least either the forming material or mold will not be able to withstand the difference in contraction during cooling at the contact surface between the forming material and the mold, and will be damaged. Accordingly, the mold of the present invention is desirably made of a heat-resistant material having good durability and a coefficient of expansion that is close to that of the forming material. Examples of such heat-resistant materials are alumina-based ($Al_2O_3$), AlTiC-based ($Al_2O_3$—TiC), zirconia-based ($ZrO_2$), silicon nitride-based ($Si_3N_4$), aluminum nitride-based (AlN), and silicon carbide-based (SiC) ceramics, as well as other ceramics having primary components in the form of $SiO_2$, $Al_2O_3$, or MgO. Here, the term "having primary components in the form of" means that these components account for equal to or greater than 50 mass percent of the structural components of the mold.

Suitable material for the mold material is a ceramic comprising equal to or greater than 99 percent of $SiO_2$, $Al_2O_3$ and MgO and the others such ac $K_2O$.

First, a mold material that has, for example, a hardness (Vickers hardness) of 7 to 24 Hv, a curvature strength of 400 to 2,000 MPa, a Young's modulus of 180 to 410 GPa, a thermal conductivity of 3.0 to 170 W/mk, a coefficient of linear expansion of 4.30 to 10.8×10 E-6, a heat resistance temperature of 750 to 850° C., and a density of 3.10 to 10.70 g/cm³ is suitable. Second, a material having a hardness (Vickers hardness) of 7 to 15 Hv, a Young's modulus of 190 to 210 GPa, a coefficient of linear expansion of 6.0 to 7.0×10 E-6, and a heat resistance temperature of 775 to 825° C. is particularly suitable. Third, a material having a hardness (Vickers hardness) of 9 to 15 Hv, a Young's modulus of 180 to 402 GPa, a coefficient of linear expansion of 4.30 to 10.8×10 E-6, and a heat resistance temperature of equal to or higher than 800° C. is particularly suitable. The mold material is also desirably hydrophobic.

In the processing of the mold, the lateral surface and the bottom surface of the mold are preferably processed in advance prior to the processing of the forming surface. The lateral surface and the bottom surface can be processed by the known lathe processing and the like. The lateral surface of the mold is to be a reference position for positioning the forming material. In addition, the bottom surface of the mold is to be a basis of processing of the forming surface of the mold. Thus, it is preferable to process both lateral surface and bottom surface with high precision. By processing the bottom surface of the mold with high precision, it is possible for the forming material to correspond its own weight with the forming surface of the mold precisely. When the support member is employed as shown in FIG. 3, the step mount processing is preferably conducted on the lateral surface to form a step mount part for supporting the support member. The step mount part can be formed by conducting cutting processing from the forming surface of the mold toward the bottom surface direction in a prescribed level, which is set depending on the size of the support member, for example, about 10 mm.

After the above processing for the lateral surface and the bottom surface, the forming surface is processed. In the method of manufacturing mold I, irregularities are formed on the forming surface, as set forth above. On the other hand, in the method of manufacturing mold II, through-holes are formed in the mold. When manufacturing the mold employed in the method of manufacturing formed article II and mold II, through-holes are arranged so as not to overlap with a position corresponding to a reference point for measurement of dioptric power in the eyeglass lens to be finally obtained.

When the through-hole is excessively large, there is a risk of affecting the upper surface shape of the forming material. Thus, the diameter of the through-hole is preferably set so as to satisfy the above-described Equation 1. For example, in the case of the mold with a thickness of 4 to 20 mm and a diameter of about 65 to 90 mm, the minimum diameter of the through-hole can be about Φ0.3 mm. However, heat-resistant materials suitable for use as a mold material is normally highly rigid, of which Vickers hardness ranges from 7 to 24 Hv, for example. Thus, when a fine acicular member (such as carbide drill) is employed to form a through-hole, the problems such as breaking of the acicular member may occur. Accordingly, in the present invention, hole-making is preferably conducted in a stepwise fashion by at least two-stage process. For example, in the first hole-making process, holes are made with a first acicular member from an opposite surface (the bottom surface of the mold) from the forming surface of the mold to a position at which the hole does not penetrate through the forming surface. Next, in the second hole-making process, a second acicular member is inserted into the hole that has been made in the first hole-making process to penetrate the hole through the forming surface. In this process, a through-hole with a small diameter can be formed by employing the second acicular member of which apical part has a diameter smaller than the diameter of the apical part of the first acicular member, while avoiding the problem of breaking of the member as in the case in which a fine member is employed to make a hole in a single stage. Specifically, when forming a through-hole with a diameter of 0.3 to 0.5 mm, it is possible to employ the first acicular member with an apical part diameter of 0.3 to 0.5 mm and the second acicular member with an apical part diameter of 2 to 4 mm.

In addition, in order to make a hole in a high rigid material as described above, the apical par of the acicular member is preferably made of a high rigid material. An example of such material is hard metal. A specific example of hard metal is a mixture including the components shown in the following Table 1.

TABLE 1

| Component | Chemical formula | Composition (mass percent) |
| --- | --- | --- |
| Tungsten carbide | WC | 55-95 |
| Tantalum carbide | TaC | 0-20 |
| Niobium carbide | NbC | 0-20 |
| Titanium carbide | TiC | 0-20 |
| Titanium nitride | TiN | 0-5 |
| zirconium carbide | ZrC | 0-5 |
| Vanadium carbide | VC | 0-5 |
| Molybdenum carbide | Mo2C | 0-5 |
| Cobalt | Co | 0-30 |
| Nickel | Ni | 0-30 |
| Chromium | Cr | 0-5 |

Among them, hard metal comprising tungsten carbide (for example, 92 to 95 mass percent) and cobalt (for example, 5 to 8 mass percent) is suitable. In addition, hard metal coated with AlN, $Al_2O_3$, (Al,Ti)N, CrN, Ti(B,C,N), (Ti,Zr)N, (Ti, Si)N and the like can be employed.

The hole-making process can be conducted by tapping. The rotation speed of the main axis can be about 10,000 rpm. Furthermore, at least one additional hole-making process can be conducted between the first hole-making process and the second hole-making process. In this case as well, a hole with a small diameter can be formed by sequentially conducting hole-making with an acicular member of which diameter is smaller than the acicular member employed in the previous hole-making process.

The forming surface of the mold can be repeatedly employed by reprocessing (cutting). Since the cross-sectional diameter of the through-hole that has been formed in the final hole-making process in which the hole is penetrated through the forming surface appears on the forming surface, the processing level of the final hole-making process is preferably determined in view of the level of removal by cutting in reprocessing when conducting reprocessing. In the case of not conducting reprocessing, holes may be made in only a small part near the forming surface in the final hole-making process.

The method of manufacturing mold II can also comprise a through-hole forming process forming a plurality of through-holes running from the forming surface to an opposite surface from the forming surface. Details thereof are as set forth above.

The method of processing the mold forming surface will be described below.

First, the upper surface of the mold is processed by crude cutting into a shape corresponding to the surface shape of the formed article to be manufactured (upper surface shape of the forming material). For example, when the forming surface is processed into a spherical surface, the surface shape is processed by crude cutting into the approximate spherical surface. The approximate spherical surface can be calculated by approximating the surface shape by the spherical shape with a least-square method. When the final shape of the forming surface have no centrosymmetry, the approximate spherical surface can be calculated by specifying the position of maximum curvature.

A finish processing can be conducted after the above crude cutting. The finish processing processes the forming surface into the final forming surface shape with a desired roughness as described above. The cutting processing can be conducted by a lathe processing. A cutting blade with a tip R of 5.0 mm can be employed as the processing blade for the lathe processing. The final cutting is conducted for the purpose of the formation of the surface with high precision and the removal of scratch, microcrack and the like on the surface generated in the crude cutting. The level of cutting in the final cutting processing of approximately 10 times more than the surface roughness is required in theory. Furthermore, in view of the cutting blade error, positioning error of the processed material, and processing accuracy of the processing device, the level of cutting is preferably set 20 to 50 times more than the surface roughness after the crude cutting processing. On the other hand, the feed pitch of the processing blade of 0.1 to 0.25 mm is preferred. Thus, the pitch of concavity and convexity on the forming surface can be formed at approximately the same interval. The trace of processing is not specifically limited so long as the interval of the feed speed is as set forth above. For example, a spiral of which center is a geometric center of the forming surface or a spiral having the center outside the forming surface, straight lines arranged in parallel at an equal interval are suitable.

The surface property of the mold for the common hot sag forming method is a mirror surface approximately with a maximum height of 0.05 micrometer and an arithmetic average roughness of 0.006 micrometer. In general, the mirror surface can be obtained by polishing processing. However, in the method of manufacturing mold I, the forming surface is processed into a surface rougher than the mirror surface and thus can be formed only by cutting processing without polishing processing.

INDUSTRIAL APPLICABILITY

The present invention is suitable for use in forming a mold for eyeglass lens.

Figure 1:
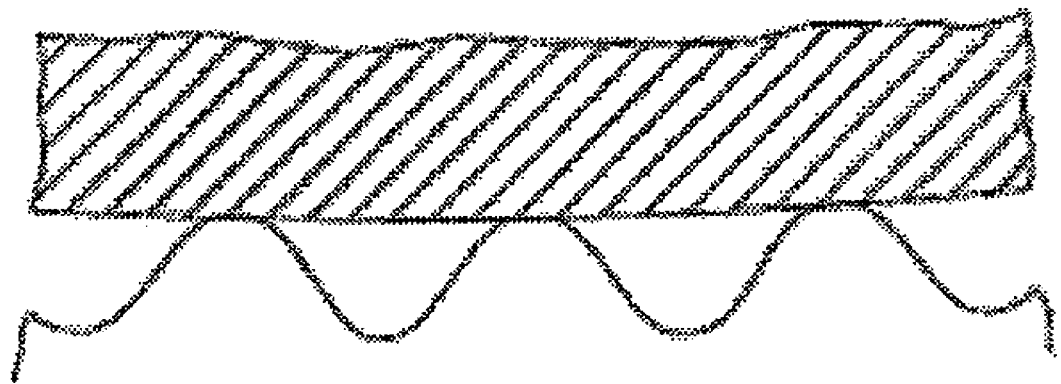
FIG. 1 It shows an enlarged schematic diagram of the state of contact between the mold and the forming material before and after heat-softening.
Figure 1:
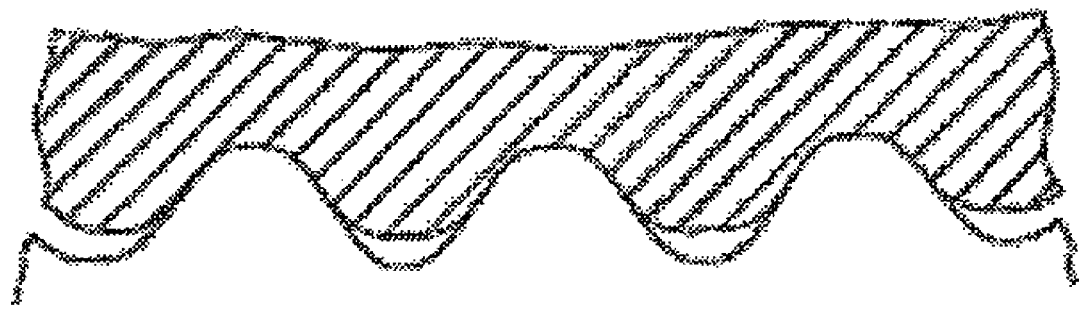
Figure 2:
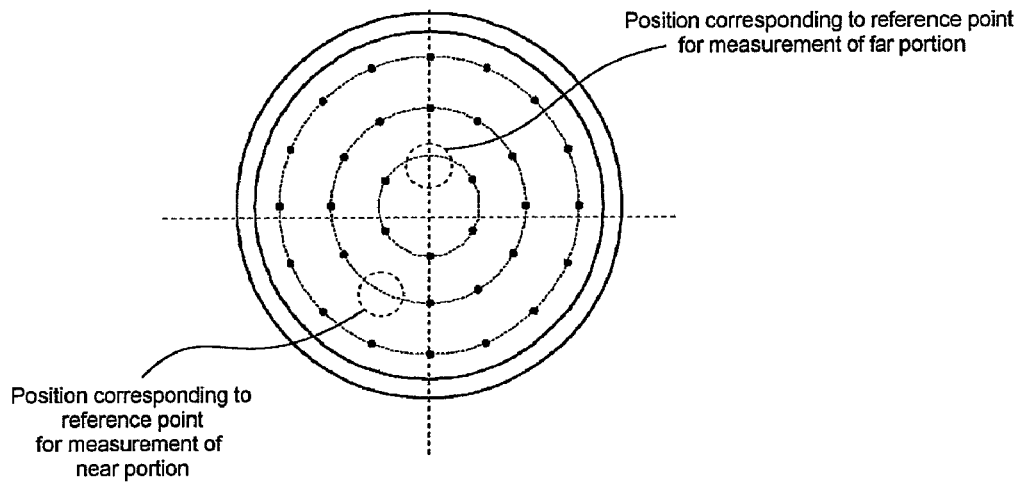
FIG. 2 It shows a specific example of the arrangement of through-holes on the forming surface of a mold.
Figure 2:
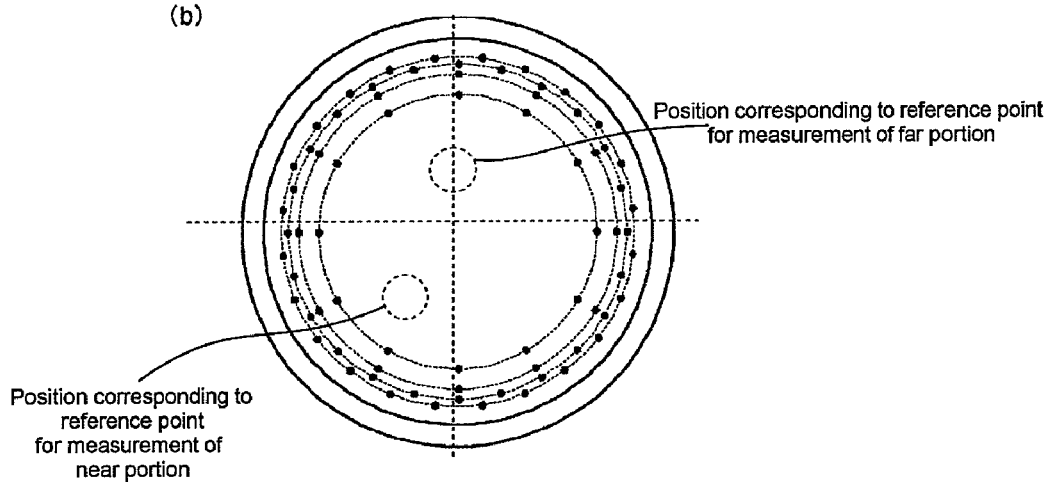
Figure 2:
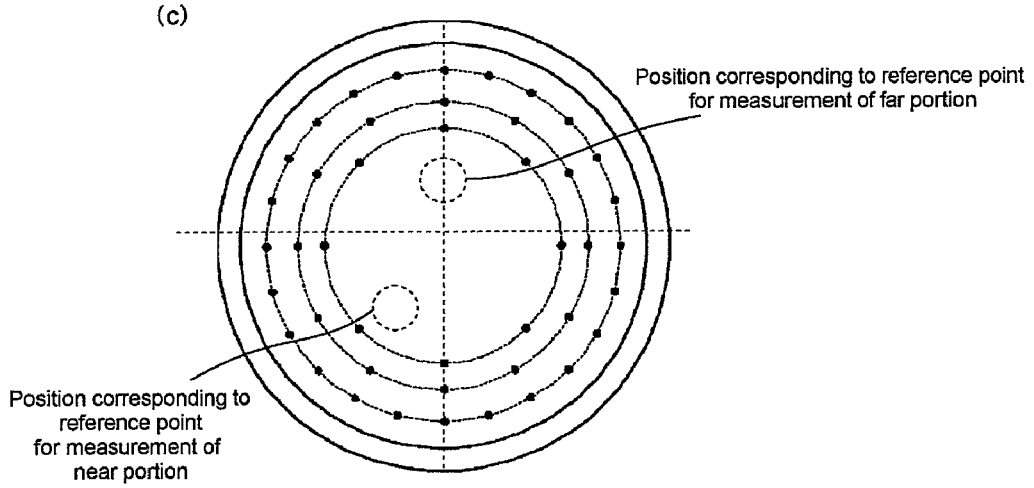
Figure 3:
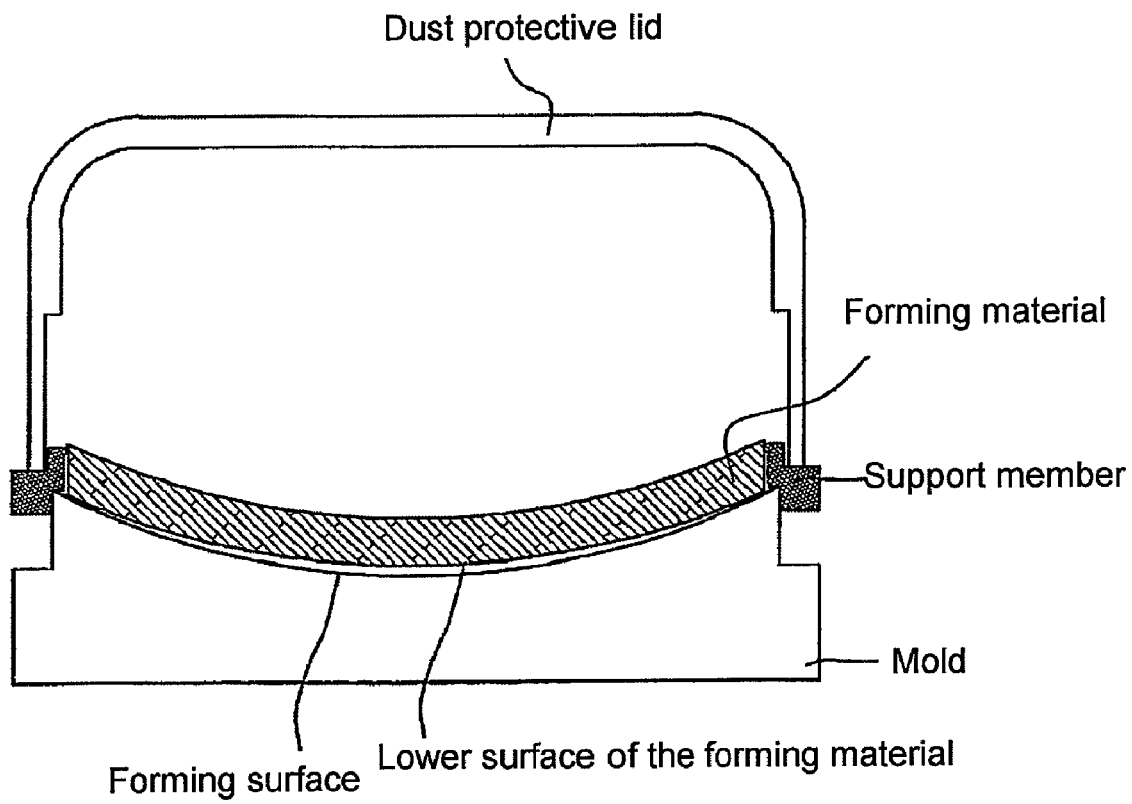
FIG. 3 It shows a schematic diagram of the state of contact between the mold and the forming material before and after softening.
Figure 3:
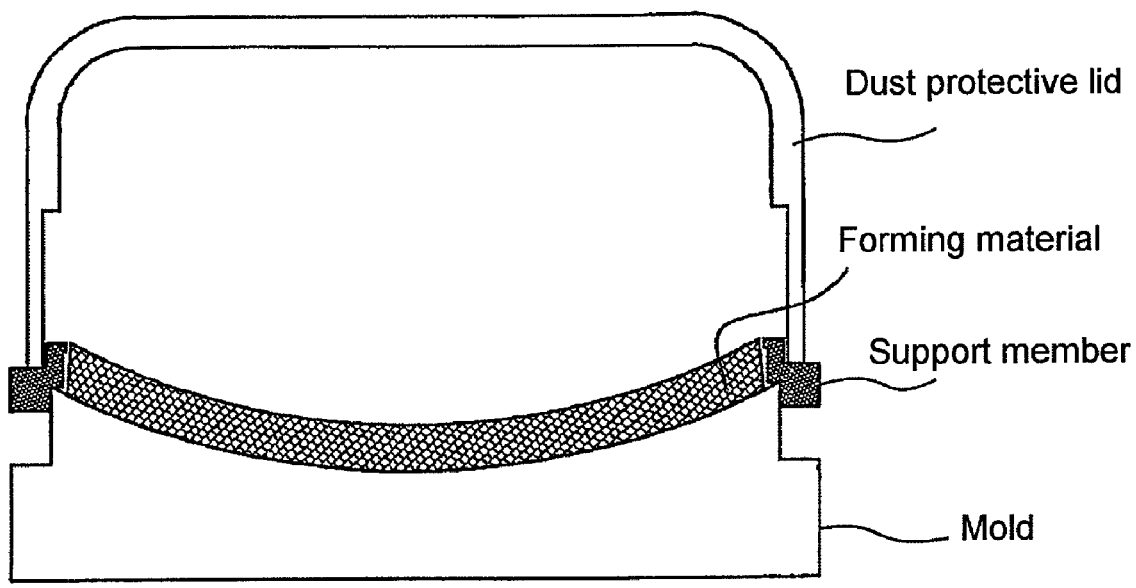
Figure 4:
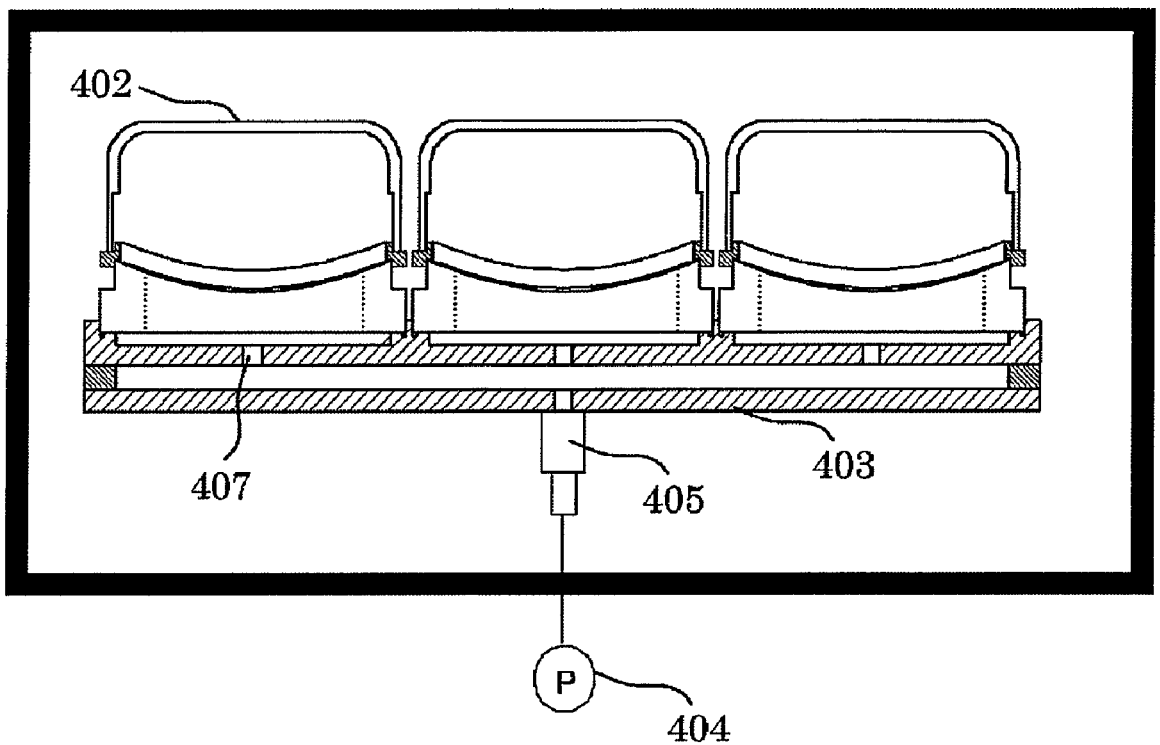
FIG. 4 It is a drawing showing an example of the suction method.
Figure 5:
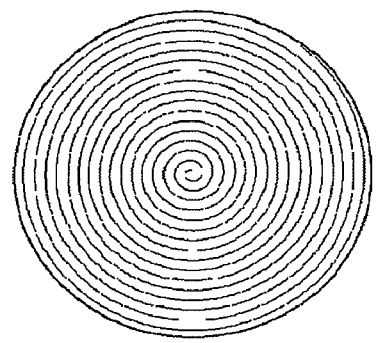
FIG. 5 They are specific examples of the pattern of irregularities on the forming surface.
Figure 5:
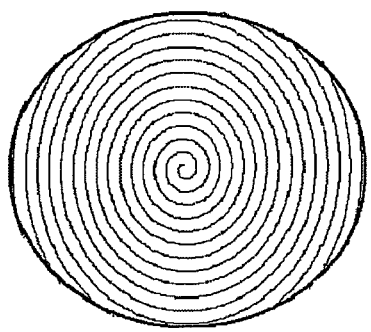
Figure 5:
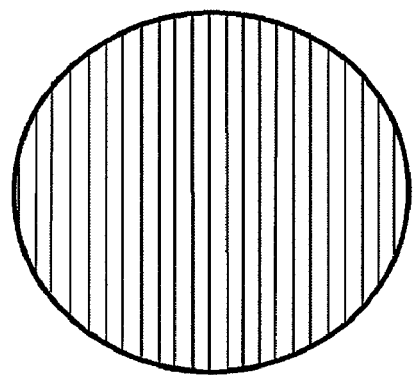

The invention claimed is:
1. A method of manufacturing a formed article, wherein the formed article is a casting mold or a portion of a casting mold for a progressive dioptric power eyeglass lens, the method comprising:
positioning a forming material comprised of a glass on a forming surface of a mold, the forming surface having a free-form shape,
heating the forming material to a temperature exceeding a glass transition temperature of the glass, whereby the forming material is unable to stand on its own weight and becomes soft, changing its shape due to gravity, and resulting in bringing a lower surface of the forming material into tight contact with the forming surface to form an upper surface of the forming material into a free-form optical surface, and wherein
as the mold, a mold having, on a forming surface thereof, a plurality of irregularities with a maximum height Rmax ranging from 3.1 to 100 micrometers and an average spacing S between local peaks ranging from 0.01 to 1.00 mm is employed, wherein the plurality of irregularities form a circular pattern, an elliptical pattern or a streaky pattern;
the mold has through-holes having a diameter in the range of 0.3 to 0.5 mm and the through-holes are provided such that positions corresponding to reference points for measurement of a dioptric power of the progressive dioptric eyeglass lens on the lower surface of the forming material do not overlap openings on the forming surface side when the forming surface and the lower surface of the forming material are brought into tight contact; and
applying suction through the through-holes.

2. The method of manufacturing a formed article according to claim 1, wherein
the plurality of through-holes extend from the forming surface to an opposite surface from the forming surface.

3. The method of manufacturing a formed article according to claim 2, wherein the openings on the forming surface side are arranged at least in a rim portion of the forming surface.

4. The method of manufacturing a formed article according to claim 3, wherein the openings on the forming surface side are arranged on at least two concentric circles.

5. The method of manufacturing a formed article according to claim 3, wherein the number of openings on the forming surface side increases from a center portion toward a rim portion of the forming surface.

6. The method of manufacturing a formed article according to claim 5, wherein the number of the openings increases in a quadric manner in proportion to a distance from a center of the forming surface.

7. The method of manufacturing a formed article according to claim 2, wherein the forming material has a thickness ranging from 3 to 8 mm.

8. The method of manufacturing a formed article according to claim 1, wherein
the reference point for measurement of dioptric power is a reference point for measurement of far portion and/or a reference point for measurement of near portion.

9. The method of manufacturing a formed article according to claim 1, wherein the suction is carried out so that a relation between a diameter of the through-hole, a viscosity of the forming material during the suction, a thickness of the forming material, and a suction pressure satisfies the following Equation 1

$$H = K \frac{(V) \times (T)^2}{(P)} \quad \text{Equation 1}$$

(In the equation, H is a diameter (mm) of the through-hole, V is a viscosity (poise) of the forming material during the suction, T is a thickness (mm) of the forming material, P is a pressure (mmHg/cm$^2$) of the suction, and K is an arbitrary coefficient.)

10. The method of manufacturing a formed article according to claim claim 1, wherein a viscosity of the forming material during the suction ranges from $6.81 \times 10^7$ to $1.28 \times 10^8$ poise.

11. The method of manufacturing a formed article according to claim 1, wherein a suction pressure during the suction ranges from 80 to 150 mmHg/cm$^2$.

12. A method of manufacturing an eyeglass lens comprising:
   manufacturing a formed article by the method according to claim 1, and
   manufacturing an eyeglass lens by cast polymerization with the formed article manufactured or a portion of the formed article manufactured as a casting mold.

13. The method of manufacturing according to claim 12, wherein the eyeglass lens is manufactured by mounting two casting molds on an annular gasket and pouring a lens starting material solution into a cavity faulted by the casting molds and the gasket to conduct polymerization, at least one of the two casting molds being the formed article manufactured or a portion of the formed article manufactured.

14. The method of manufacturing according to claim 12, wherein the eyeglass lens is a single-vision eyeglass lens, multifocal eyeglass lens, or progressive dioptric power eyeglass lens.

* * * * *